United States Patent [19]

Oestreich

[11] Patent Number: 4,720,164

[45] Date of Patent: Jan. 19, 1988

[54] PRESSURE-TIGHT OPTICAL CABLE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 751,968

[22] Filed: Jul. 5, 1985

[30] Foreign Application Priority Data

Jul. 5, 1984 [DE] Fed. Rep. of Germany ....... 3424808

[51] Int. Cl.[4] .............................................. G02B 6/44
[52] U.S. Cl. ................................................. 350/96.23
[58] Field of Search ...................................... 350/96.23

[56] References Cited

U.S. PATENT DOCUMENTS

| | | | |
|---|---|---|---|
| 4,072,398 | 2/1978 | Larsen et al. | 350/96.23 |
| 4,230,395 | 10/1980 | Dean et al. | 350/96.23 |
| 4,312,565 | 1/1982 | Oestreich et al. | 350/96.23 |
| 4,312,566 | 1/1982 | Jackson | 350/96.23 |
| 4,342,500 | 8/1982 | Oestreich et al. | 350/96.23 |
| 4,443,657 | 4/1984 | Hill et al. | 350/96.23 X |
| 4,645,298 | 2/1987 | Gartside, III | 350/96.23 |

FOREIGN PATENT DOCUMENTS

| | | | |
|---|---|---|---|
| 2907704 | 9/1980 | Fed. Rep. of Germany | 350/96.23 |
| 2065324 | 6/1981 | United Kingdom | 350/96.23 |

Primary Examiner—John Lee
Attorney, Agent, or Firm—Hill, Van Santen, Steadman & Simpson

[57] ABSTRACT

Different sealing compounds are provided in the region of the cable core in such fashion that a softer sealing compound is disposed in the direct proximity of the light waveguides and at least one harder sealing compound is disposed at a greater distance therefrom. A high resistance to pressure and a gentle embedding of the light waveguides are thereby simultaneously guaranteed.

8 Claims, 1 Drawing Figure

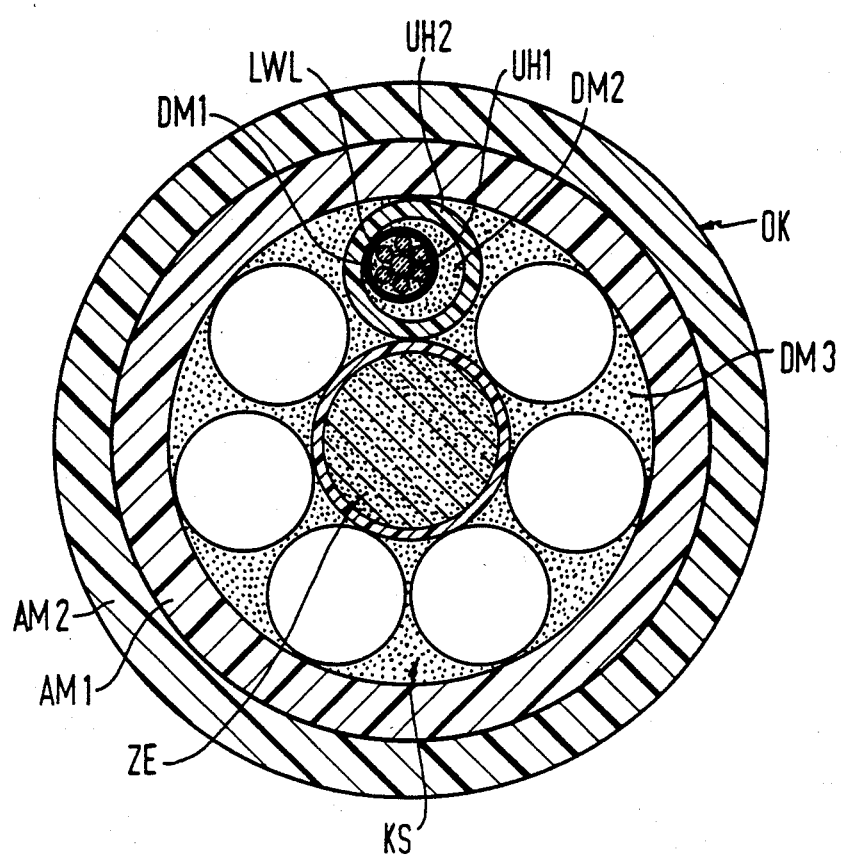

PRESSURE-TIGHT OPTICAL CABLE

BACKGROUND OF THE INVENTION

1. Field of the Invention

The invention relates to a pressure-tight optical cable comprising a sealing compound disposed in the region of the cable core and a pressure-resistant outside cladding surrounding the sealing compound.

2. Description of the Prior Art

An optical cable of this type is disclosed by the German Letters Patent No. 28 47 382. The outside cladding is designed two-ply, whereby a spun thread or fabric is provided as an intermediate ply whose length of lay approximately corresponds to the diameter of the cable core. A non-spaced pressure winding tightly surrounding the cable core is provided at certain intervals by shortening the length of lay.

When such cables are provided with filling compounds in their interior, difficulties result because filling compounds which have a sufficiently high modulus of elasticity and do not appreciably or completely relax are required in order to achieve a good sealing effect under higher pressures. However, filling compounds that are as soft as possible are desirable for the embedding of the light waveguides, i.e. filling compounds that have a very low modulus of elasticity and relax greatly, so that they can keep mechanical stresses of the cable away from the sensitive light waveguides to the greatest possible degree.

SUMMARY OF THE INVENTION

An object of the present invention is to improve a pressure-tight optical cable of the type described above such that both a particularly high pressure tightness as well as an optimum preservation of the sensitive light waveguide fibers from mechanical stresses can be achieved. This is obtained in accord with the invention by using different sealing compounds such that a softer sealing compound is provided in the direct proximity of the light waveguides and at least one harder sealing compound is provided at a greater distance from the waveguides.

The basic concept of the invention is that softer sealing compounds be provided in the region of the sensitive light waveguide fibers so that the light waveguides continue to be softly embedded and are thus protected against mechanical stresses. By contrast, the sealing compound or compounds that lie at a greater distance from the light waveguides, and usually fill up larger cross-sections, are designed correspondingly harder and are thereby held with better topical stability against a stress due to a pressure (particularly a gas pressure) attacking in longitudinal direction. The inventive execution of an optical cable thus simultaneously provides an optimum protection of the light waveguides given a simultaneously high tightness value even under correspondingly high pressure.

A preferred embodiment of the invention provides that the softer sealing compound fills a correspondingly smaller cross-section of the cable core than the harder sealing compound. This can generally be very easily realized because the light waveguides usually take up only a very small part of the overall cross-section of the cable core under normal conditions. It is thus adequate to embed the light waveguides in a correspondingly soft sealing compound in their immediate proximity and to fill the by far larger, remaining cross-sectional spaces of the cable core with the harder sealing compound.

A further advantageous embodiment of the invention provides that the modulus of elasticity of the harder sealing compound in comparison to the modulus of elasticity of the softer sealing compound is at least roughly proportional to the circumference or radius of the appertaining sealing cross-section. An optimum balance thereby results between the viscosity of the sealing compound and the problem of pressure tightness. The adhesion of the sealing compound to the circumference of the sealing cross-section is also presumed; i.e., the adhesive forces must increase at least to the same degree.

A preferred development of the invention further provides that the viscosity of the harder sealing compound is increased roughly proportional to the sealing cross-section in comparison to the viscosity of the softer sealing compound.

When different cross-sections of the cable cores are provided, i.e. when an entire family of pressure-tight cable types is employed, then the moduli of elasticity of the claddings or sheaths are increased roughly proportional to the diameter of the cable core. This is of significance because the stability properties of the claddings also enter into the pressure tightness of the cable cross-section.

Another preferred development of the invention provides that the various sealing compounds be provided in respectively different claddings which are expediently designed hose-like. The above demand can thereby be met in a particularly simple fashion and it is assured that no undesirable mixing or migration of the various sealing compounds can occur in the laid cable.

BRIEF DESCRIPTION OF THE DRAWING

The invention and the development thereof shall be explained in greater detail below with reference to the FIGURE in which an optical cable sealed against gas pressure and having different sealing compounds is shown in cross-section.

DESCRIPTION OF THE PREFERRED EMBODIMENTS

Provided as transmission elements in the present example are seven respective light waveguides LWL combined into a bundle which are enclosed by a first cladding UH1. The light waveguides LWL can be stranded with one another, in SZ fashion as well. The (not tightly seated) hose-like cladding UH1 lies relatively close to the bundle of light waveguides, so that the cross-section of this arrangement can be kept as small as possible. The interstices which are formed by the gores of the light waveguide fibers LWL fashioned with a circular cross-section are filled with a particularly soft sealing compound DM1. The mobility of the light waveguide fibers relative to one another is ensured when, for example, the cable is laid. As a consequence of the small cross-sectional area which is filled by the sealing compound DM1, it can also be assured even under high gas pressures that the sealing compound will not be pressed out and the pressure tightness would thereby be lost.

The first cladding UH1 containing the light waveguides LWL is disposed in a further cladding UH2 which serves as an intermediate sheath and has a correspondingly larger cross-section than the cladding UH1. The free space thereby arising between the two claddings is filled with a further sealing compound DM2 which is harder than the sealing compound DM1. It is thereby guaranteed that the attacking gas pressure, due to the higher toughness and stability of this second sealing compound DM2, is likewise not in a position of pressing this out of the inside of the cladding UH2.

The present example incorporates seven such sheath arrangements in the cable OK, all of these having the same structure (which, however, is not shown in detail in order to keep the illustration simple). Overall, thus, the optical communications cable has 49 light waveguide fibers. The intermediate sheaths UH2 are stranded onto a central tensile and supporting element ZE which can be composed of steel or plastic and is itself longitudinally tight. A two-ply cladding is provided at the outside of the cable OK, this being composed of an inside layer AM1 and of an outside layer AM2. The gores deriving between the central element ZE and the inside wall of the inner cladding ply AM1 are filled with a further sealing compound DM3. This sealing compound DM3 is selected such that it is even harder than the sealing compound DM2.

With respect to the sealing compounds DM1 through DM3 employed therein, the illustrated optical cable OK thus has the property that sealing compounds having an especially soft consistency are used in the immediate proximity of the optical fibers LWL (i.e. inside UH1), sealing compounds having a harder consistency are used at a greater distance therefrom (in the region of the cladding UH2), and sealing compounds having a particularly hard consistency are used in the region of the gores between the claddings UH2 and the outside sheath AM1. The cross-sectional area filled by each sealing compound is smaller, the softer their consistency.

It is advantageous when the modulus of elasticity of the respectively harder sealing compounds (i.e., from DM3 in the direction toward DM1) is increased in comparison to the modulus of elasticity of the softer sealing compound (i.e., referred to DM1), being increased at least roughly proportional to the respectively appertaining circumference of the sealing cross-section which is illustrated as being circular.

With the same advantageous results, the viscosity of the harder sealing compound (DM3 in the present example) is likewise increased in comparison to the viscosity of the softer sealing compound (DM1 in the present example), roughly proportional to the appertaining sealing cross-section, i.e. to that cross-section that is respectively occupied by the corresponding sealing compound DM3 through DM1. The sealing compound should thus be relatively harder the larger the gores in the respective, individual regions.

The use of separate claddings UH1 and UH2 for bounding the various sealing compounds DM1, DM2 as well as DM3 from one another has the advantage that no mixing can occur between the sealing compounds and, moreover, the manufacturing method can be designed in a particularly simple fashion. In the present example, the sealing compound DM1 is first applied to the bundle comprising the light waveguides LWL, and the cladding UH1 is subsequently applied (for example, in a hose-drawing method). The application of the cladding UH2 then follows, whereby the feed of the sealing compound DM2 can ensue, for example, by means of a filling needle or the like. The core filling compound DM3 is applied through an appropriate filling bell or the like before the inner sheath AM1 is extruded onto the cable core.

When the modulus of elasticity is increased at least in accord with the appertaining circumference of the sealing cross-section and the viscosity is also increased to the same degree at the same time, a quadratic dependency derives overall in an advantageous way. The same elastic or plastic mass-column displacements result therefrom for all filling cross-sections given the same pressure, thus providing an arrangement that is particularly stable under gas pressure A further important point of view for the construction of an optical cable sealed against gas pressure is its radial inflatability. The inflatability is identically effective for all sub-cross-sections and would effect the separation of the filling agent from the respectively allocated inside or outside sheath when gas penetrates into the sealed space. Both effects, namely the column displacement and the inflation are to be equally taken into consideration. Cable types having an increasing diameter (normally, i.e. given increasing numbers of fibers) should therefore be given a correspondingly stronger outside sheath. It is expedient overall when the modulus of elasticity of the outside sheath (formed by the sheath layers AM1 and AM2 in the present example) increases at least linearly proportional to the diameter of the cable core.

For a cable having 49 fibers in accord with the cross-sectional illustration, the layout values cited below provide an advantageous result:

| | | |
|---|---|---|
| Sealing compound DM1 in small inside gores between fibers LWL (radius about 0.01 mm) | $E \approx 0.01$ N/mm$^2$ $\eta \approx 10^4$ | $\dfrac{Ns}{m^2}$ |
| Sealing compound DM2 in large outside gores between bundles and UH2 (radius about 1 mm) | $E \approx 1$ N/mm$^2$ $\eta \approx 10^6$ | $\dfrac{Ns}{m^2}$ |
| Sealing compound DM3 outside of UH2 | $E \approx 100$ N/mm$^2$ $\approx 10^8$ | $\dfrac{Ns}{m^2}$ |

The illustrated cable structure has roughly the following values of diameter:

| | Diameter (mm) |
|---|---|
| LWL fiber 125/500 mCBS | 0.5 |
| Bundle of 7 fibers LWL (1 + 6) stranded with long lay, filled with cross-linked silicon filling compound DM1 | 1.5 |
| Cladding UH1 with wall thickness 0.2 mm of PUR | 2.0 |
| Cladding UH2 of ECTFE or ETFE or PAT 12 or the like 2.8/4.0 filled with cross-linked silicon filling compound as sealing compound DM2 | 4.0 |
| Central element ZE (RC-glass/epoxy) 5.0, thickened to with hard hot-melt adhesive | 5.6 |
| 7 Claddings UH2 4.0 with 120 mm SZ-stranded onto central element ZE (with 0.2 mm spacing), filled with hard hot-melt adhesive as sealing compound DM3 | 13.6 |
| PAT12-TR55 inside sheath AM1 1.5 mm (aromatic PAT12) | 16.8 |
| HDPE outside cladding AM2 1.5 mm wall thickness glued with hard hot-melt adhesive as connection to AM1 | 20.0 |

Thereby denoting are:

ECTFE=Copolymer of ethylene—monochlorine—trifluorine—ethylene.

ETFE=ethylene—tetrafluorine—ethylene.

PAT 12=polyamid—terpolymer with 12 aliphatic groups ($CH_2$)

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. In a pressure-tight optical cable having a cable core with a plurality of light waveguides, a sealing compound disposed in the region of said cable core and a pressure-tight outside sheath surrounding said cable core, the improvement comprising different sealing compounds being provided such that a softer sealing compound is disopsed in the immediate proximity of the light waveguides and at least one harder sealing compound being disposed at a greater distance therefrom within the sheath, said softer sealing compound filling a smaller cross section of said cable core than does said harder sealing compound, said harder sealing compound having a modulus of elasticity greater than a modulus of elasticity of said softer sealing compound by an amount at least roughly proportional to respective circumferences of the appertaining sealed cross sections, said harder sealing compound having a viscosity greater than a viscosity of said softer sealing compound by an amount at least roughtly proportional to respective circumferences of the appertaining sealed cross sections, and said different sealing compounds being disposed within different hose-like claddings.

2. A cable according to claim 1, wherein given various cross-section of the cable core the modulus of elasticity of the outside sheath is increased roughly proportional to the diameter of the cable core.

3. A cable according to claim 1, wherein a longitudinally tight tensile and supporting element is disposed in the center of the cable core.

4. A cable according to claim 1, wherein a hot-melt adhesive material is employed as the harder sealing compound.

5. A cable according to claim 1, wherein the light waveguides are combined into a bundle and are loosely surrounded by a cladding.

6. A cable according to claim 5, wherein said cladding containing the light waveguides is loosely accomodated in a further cladding and in that a plurality of such further claddings lie in the inside of the cable sheath.

7. A pressure tight optical cable comprising:
a plurality of light waveguides;
an outside sheath surrounding said waveguides;
a plurality of sealing compounds surrounding said waveguides within said sheath;
said sealing compounds comprising a soft compound immediately adjacent said waveguides and at least one harder compound spaced from said waveguides within said sheath, said at least one harder compound having a modulus of elasticity greater than a modulus of elasticity of said soft compound by an amount roughly proportional to respective cross sections of said soft and at least one harder compounds, said at least one harder compound having a viscosity greater than a viscosity of said soft compound by an amount roughly proportional to the respective cross sections of said soft and at least one harder compounds;
whereby said cable is resistant to axial pressure and at the same time the light waveguides are gently embedded.

8. A pressure tight optical cable comprising:
a plurality of light waveguides;
an outside sheath surrounding said waveguides;
a plurality of sealing compounds surrounding said waveguides within said sheath;
said sealing compounds comprising a soft compound immediately adjacent said waveguides and at least one harder compound spaced from said waveguides within said sheath, said compounds being disposed in different hose-like claddings;
said soft compound filling a smaller cross section of said cable than does said harder compounds, the modulus of elasticity of said at least one harder compound being greater relative to the modulus of elasticity of said soft compound by an amount at least roughly proportional to the circumference of the respective sealed cross-sections, said at least one harder sealing compound having a viscosity greater than a viscosity of said soft compound by an amount at least roughly proportional to respective circumferences of the respective sealed cross sections.

* * * * *